United States Patent

Mitchell et al.

[15] 3,681,897

[45] Aug. 8, 1972

[54] SOLVENT SKIMMING DEVICE FOR CAUSTIC WASHER

[72] Inventors: Norris W. Mitchell; Frank W. Skraba; William L. Houston, Jr., all of Sweeny, Tex.

[73] Assignee: Phillips Petroleum Company

[22] Filed: Aug. 11, 1970

[21] Appl. No.: 62,865

[52] U.S. Cl. ..........................55/227, 55/84, 55/93, 55/94, 55/228, 261/114
[51] Int. Cl. ............................................B01d 47/00
[58] Field of Search........55/93, 94, 83, 84, 227, 228; 261/113, 114

[56] References Cited

UNITED STATES PATENTS

| | | | |
|---|---|---|---|
| 2,853,281 | 9/1958 | Hibshman et al. | 261/114 |
| 2,678,199 | 5/1954 | Koch | 261/113 X |
| 3,151,046 | 9/1964 | Larson | 261/113 X |
| 2,810,450 | 10/1957 | Hartmann | 55/94 X |
| 2,302,130 | 11/1942 | Leech | 55/93 X |

Primary Examiner—Howard R. Caine
Attorney—Young and Quigg

[57] ABSTRACT

Apparatus is provided for treating a cracked hydrocarbon gas, e.g., an effluent resulting from the pyrolytic conversion of a feed, consisting essentially of ethane to form ethylene, is treated with an alkali wash, in an apparatus comprising in one embodiment thereof means for a complete treatment of said gas, a tower in which in its lower portion there is a partition extending upwardly from a point near the tower bottom to provide at least two sections in the bottom of the tower, means for introducing gas into the tower, the partition providing in the bottom of the tower an essentially gas-free section, means for also introducing into said tower a solvent for treating said treating solution, means for withdrawing treating solution from said gas-free section, means for withdrawing solvent from a place in said gas-free section, and means for shielding or baffling said place; there being provided above the sections formed by the partition a top section for water washing gas to remove therefrom any entrained treating solution and/or solvent; and a section below said top section for treating gas with treating solution a section below the last mentioned section for treating gas with further treating solution and/or with solvent, introduced to dissolve from said treating solution a polymer formed therein and/or polymer forming constituents. Apparatus is also provided for treating the used solvent by contact with an adsorbent, e.g., activated charcoal or carbon or functional equivalent, to remove from the solvent polymer and polymer-forming constituents, rendering the solvent suitable for reuse and avoiding ultimate plugging of pumps, pipes, heat exchangers and other equipment.

6 Claims, 1 Drawing Figure

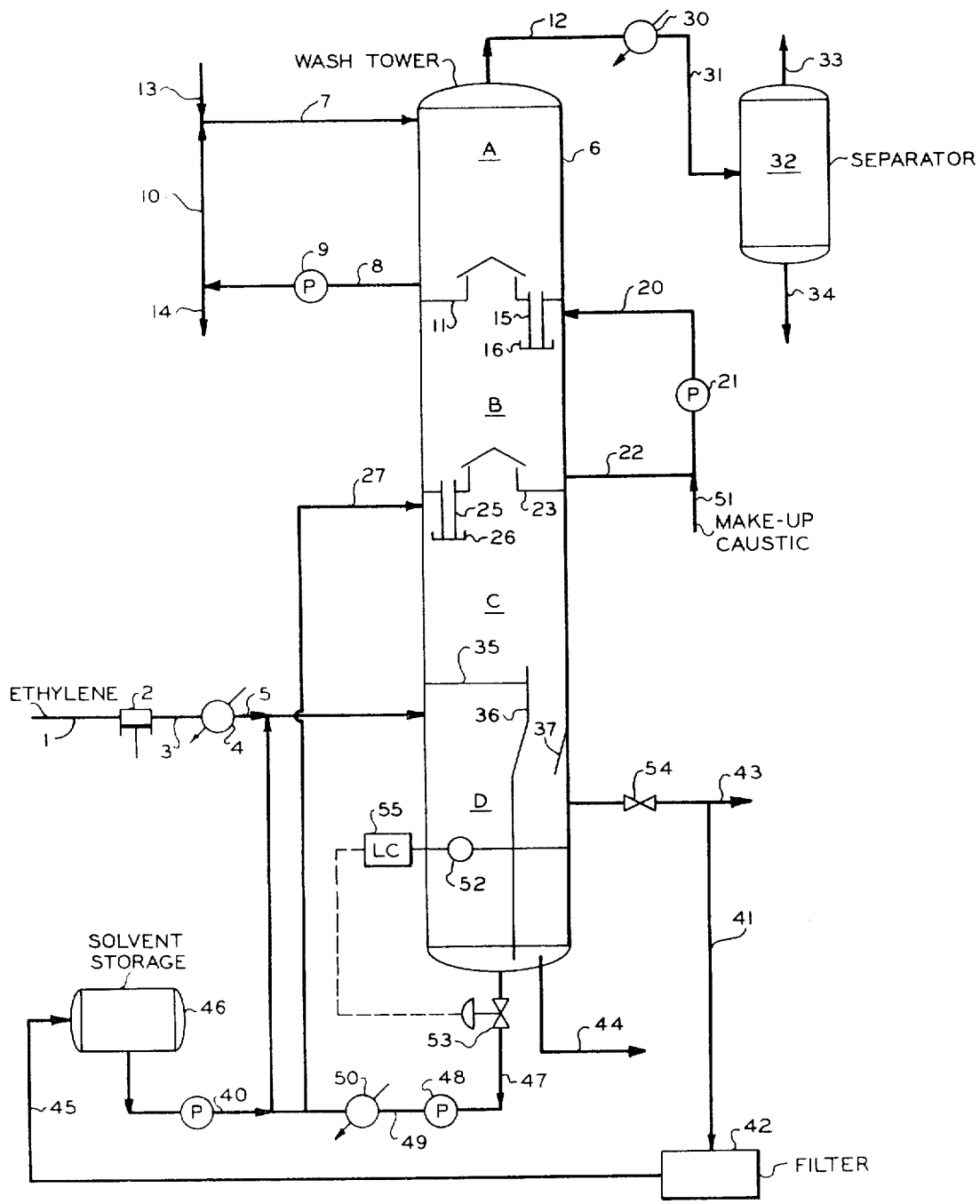

SOLVENT SKIMMING DEVICE FOR CAUSTIC WASHER

APPARATUS FOR REMOVAL OF POLYMER FROM CRACKED GAS CAUSTIC WASHES OR CAUSTIC SOLUTIONS

This invention relates to an apparatus suitable in the production of a treated hydrocarbon gas. In one of its aspects it relates to an apparatus suitable in the treatment of a hydrocarbon gas with an alkaline or caustic solution, e.g., an ethylene gas containing stream obtained by pyrolysis of a hydrocarbon such as ethane or propane and to the treatment of the thus used solution. In a further aspect of the invention it relates to an apparatus useful in the removal of polymers and/or polymer-forming constituents from a caustic solution used to treat a stream of gas containing such constituents.

In one of its concepts the invention provides an apparatus useful in a method wherein a gas containing stream, e.g., an ethylene gas stream, being processed to prepare high purity ethylene, is washed with an alkali caustic solution by contacting the same and the gas in a contacting zone adapted to cause intimate admixture of the gas and the solution in a manner to take into the body of the wash solution, although not necessarily dissolving the same, any polymer-forming material carried by the gas resulting in the accumulation in the wash solution of polymeric material, usually a solid kernel-like material for the most part of it, and other polymer-forming constituents and the solution containing said material or constituents is treated either intermittently or continuously with a solvent or preferential carrier for said polymer and polymer-forming constituents, the solvent being, for example, a saturated liquid hydrocarbon or an aromatic liquid hydrocarbon, the latter now being preferred.

It has been found in the caustic wash treatment of a gas stream containing a fair amount of ethylene, say, at least about 50 per cent and usually about 80 per cent, derived from the pyrolysis of ethane and, therefore, unavoidably containing some unsaturated hydrocarbons, e.g., butene, butadiene, etc., that the caustic solution in the treatment, as in the wash column, exhibits the formation of polymer therein resulting in plugging pumps and related equipment. Manifestly, it is not a good solution to continually use strainers which must be continually cleaned. The strainers will get plugged which cause operational problems.

There is described and claimed in Ser. No. 872,309, filed Oct. 29, 1969, by William L. Houston, Jr. and William C. Clark as a solution to the problem which has been encountered, the periodic or continuous treatment of the wash solution with a solvent, as herein described, will considerably remove polymers from the wash solution. Further, it is described in said application that treatment of the used solvent with an adsorbent, e.g., activated charcoal to remove the polymer, indeed, polymer-forming constituents from the used solvent considerably cuts down the initial polymer formation and the amount of total polymer formed as well as the amount of wash solution needed over a period of time.

An object of this invention is to provide an apparatus for treating a caustic or alkaline wash which has been used to treat a hydrocarbon gas. Another object of the invention is to provide an apparatus useful to extend the useful life of such a wash. A further object of the invention is to provide an apparatus for the removal of polymer and/or polymer-forming constituents from a used caustic wash as herein described. A still further object is to avoid deposition and/or plugging of equipment by polymeric materials. A further object still is to provide an apparatus useful to remove a solvent polymeric and/or polymer-forming constituents contained therein.

Other aspects, concepts, objects and the several advantages of the invention are apparent from this disclosure, the drawing and the appended claims.

According to the present invention there is provided an apparatus suitable for effecting a method for treating a used aqueous alkali wash liquid such as aqueous NaOH containing solid polymers and polymer-forming constituents resulting in said liquid when used to wash a gas effluent resulting from the pyrolytic conversion of a normally gaseous hydrocarbon to form a gaseous unsaturated hydrocarbon which comprises intimately contacting said used liquid with a solvent which will remove therefrom said solid polymer and said polymer-forming constituents so that upon reuse of said liquid formation of additional polymer therein by said polymer-forming constituents will be avoided thus to avoid plugging of pumps, pipes, etc., the apparatus comprising a tower having in its lower portion at least one treating section, said section containing a partition extending from a point near the bottom of said tower upwardly therein to provide at least two subsections, means for feeding a gas to be treated into one of said subsections, means for feeding treating solution into said tower to provide treating solution above said means for feeding a gas, means for feeding into said tower and into contact with treating solution therein a solvent for removing polymer and/or polymer forming constituents from said treating solution, means in another of the subsections to remove therefrom at a place a portion of said solvent when it has contacted said treating solution, said place being above the bottom of said tower but below the top said another of said subsections, a means to shield said place against downflowing liquid to maintain at said place a relatively quiescent zone and means to remove and to recirculate, as may be desired, treating solution from the bottom of said tower for reuse.

Further, according to the invention, the tower above the treating section containing the partition and the shielded or baffle protected place or quiescent zone is constructed to provide at least one further section in which the treating liquid or the solution such as caustic wash can be introduced and there be contacted intimately with the gas to remove therefrom polymer and/or polymer forming constituents. Said further section and/or the subsection to the far side of the partition away from the quiescent zone being provided with means for introducing a solvent capable of removing from said treating solution polymer and/or polymer forming constituents. Further still, according to the invention, the tower is composed of at least four sections wherein from top to bottom there are provided means to water wash to remove any caustic carryover, means to provide a strong caustic wash, means to provide a dilute caustic wash to remove polymer and polymer-forming constituents, and means to provide an oil and polymer from caustic wash separation sections.

Further, and still according to the invention, means are provided in the top section of said tower to circulate a water wash, said means comprising a tray for collecting water, pumping and circulating means for removing said water from said tray and treating it to the top of said tower to provide a counter current flow of water to the gas, means to permit gas flowing up the tower to enter into the bottom of said top section, and means associated with said tray to permit a portion of water containing treating solution and trained by the treated gas to pass into the section below said top section.

Still further, the invention provides associated with the section below said top section means to circulate, say, strong treating solution thereinto to contact the gas, means to collect and to remove used treating solution and to return the same to said section below said top section and means to permit a portion of the used treating solution to pass downwardly into a section of the tower above said treating section in said lower portion of said tower, means associated with said section above said treating section in said lower portion of said tower and with the bottom of said tower to recover from the bottom of said tower used treating solution and to pass the same into said section above said treating section and means to introduce the gas to be treated into said tower in a manner to cause said gas to be treated at least in said section above said treating section in said section in said lower portion of said tower.

According to the invention, the solvent, e.g., a liquid hydrocarbon, is introduced to any desired level of the tower. The solvent will, of course, be so selected and so introduced that entrainment thereof with the gas from the top of the tower will be avoided substantially. Also, the solvent will be so introduced that it will not interfere with the creation of a quiescent zone, earlier described, from which it can be removed with substantially little or no treating solution entrained therewith, as will become more fully understood as this description continues.

Also, according to the present invention there is provided a contacting apparatus as stated herein wherein the used solvent containing polymer and polymer-forming constituents is contacted with a treating agent to remove from said used solvent polymer and polymer-forming constituents so that the formation of additional polymer in the wash operation by said polymer-forming constituents upon reuse of said wash fluid and/or said solvent will be avoided, the apparatus comprising means to circulate used solvent from said relatively quiescent place to said contacting apparatus and therefrom ultimately to said tower for further use.

A now preferred solvent is an aromatic, e.g., benzene, toluene, xylene, mixed xylenes, pyrolysis gasoline, methanol, etc.

A now preferred treating agent to treat the solvent is activated charcoal, activated carbon, or other known filtering agent.

The dry polymer, upon removal from the spent caustic taken from the caustic wash column in an ethylene gas treating unit looked like a mixture of fine granules with varying crumb sizes up to about one-fourth-inch. The granules tend to grow to the larger sizes over a period of time.

As stated in said Ser. No. 872,309, the invention is practiced by injecting into the wash column or other treating zone separately or together with the ethylene containing gas stream a relatively small amount of the selected solvent, say, benzene or toluene. A tower, as herein described, can be "depolymered" simply by injecting it periodically, say, twice a week, with an amount of solvent sufficient to reduce or eliminate the polymer therein. This polymer in the tower is in the caustic solution also in the tower. Thus, here and in the claims the removal of polymer and/or polymer-forming constituents from the caustic solution is inclusive of removal of these materials from the equipment containing the solution as well as from the solution per se, regardless of its instant location.

The materials removed are simply put polymers resulting from a gas resulting from a pyrolysis of a gaseous hydrocarbon such as ethane which due to its process of production and recovery is substantially pure. Such a feed, e.g., ethane, will have, usually, a composition approximated by the following:

| | |
|---|---|
| Hydrogen | 0.0 |
| Methane | 1.900 |
| Ethylene | 0.0 |
| Ethane | 96.500 |
| Acetylene | 0.0 |
| Propylene | 1.300 |
| Propane | 0.300 |
| Butene | 0.0 |
| Butadiene | 0.0 |
| N-butane | 0.0 |
| Sum: | 100.000 |

It will be seen that the stream is substantially all hydrocarbon, there being contained in such a stream virtually no sulfur, for example. Indeed, the sulfur in such a stream is of the order of 1 part per million.

The injection of the tower can be accomplished also by pumping the solvent into the caustic wash circulation line. When there are two or more washes, e.g., a strong caustic wash (circa 10 per cent NaOH concentration) and a weak caustic wash (circa 2.5 per cent NaOH concentration), the solvent is usually injected into the weak or lowermost caustic wash, i.e., that with which the gas to be treated first comes into contact.

The solvent and polymer contained therein is usually less dense than the caustic wash. It is drawn off or decanted through an outlet above the pool or reservoir of wash liquid in the bottom of the wash zone.

It is within the scope of the invention to inject the solvent into more than one wash section or into more than one place in each section injected.

As stated, the gas treated usually results from pyrolysis of a hydrocarbon as in the production of ethylene. Thus, a feed, as above tabulated, when cracked at, say, 1,500°–1,550° F., and at approximately atmospheric pressure will yield a furnace effluent having the following approximation:

| | |
|---|---|
| Carbon Monoxide | 0.29 |
| Carbon Dioxide | 0.00 |
| Hydrogen | 28.83 |
| Methane | 10.38 |
| Acetylene | 0.28 |
| Ethylene | 34.34 |
| Ethane | 24.38 |
| Propylene | 0.65 |
| Propane | 0.23 |
| Butadienes | 0.23 |
| Butylenes | 0.23 |
| $C_3$+ & Oils | 0.16 |
| Sum: | 100.00 |

It will be noted that there is present in the pyrolysis effluent butylenes and butadiene, unsaturated monomers which tend to form polymeric materials. The "oils", no doubt, also contain some unsaturated materials and can be expected to be and are, indeed, to an extent, aromatic in character being derived from a high temperature pyrolysis as one skilled in the art will recognize.

The pyrolyzed gas is cooled and water quenched, compressed, cooled, subjected to knock-out drum operation and then caustic treated as further described in connection with the drawing.

Referring now to the drawing, an ethylene stream 1, resulting from the pyrolysis of an ethane feed stream as herein described and which has been water quenched, compressed and passed through a knock-out zone is passed by compressor 2, by 3, cooler 4 and 5 into the lower portion of caustic wash tower 6. Caustic wash tower 6 is composed of essentially four sections, from top to bottoms, A, B, C, and D, respectively.

Water which contacts the gas is circulated by 7, 8, pump 9 and 10 into the top of the tower to an upper tray, collected at a lower doughnut-type tray 11 to wash the gases taken overhead at 12. Some water is added to the system, for example, steam condensate at 13. Also, some used water is removed to sewer at 14. A small portion of the water in section A may, but preferably does not, pass downwardly through downcomer pipe 15. However, enough water is overflowed into downcomer pipe 15 to insure a substantial gas or vapor seal at its foot by filling seal cup 16.

In section B of the tower the gas contacts a strong caustic solution (e.g., 10 per cent) introduced at the upper portion of section B by 20 being pumped by pump 21 and recovered to the suction of pump 21 by 22 from doughnut tray 23 which delineates the bottom of section B.

At least sufficient solution overflows into downcomer 25 to fill seal cup 26.

In section C the gas contacts a dilute caustic solution (e.g., 2–3 per cent) introduced by 27 to this section to the upper portion thereof above the entry of the gas feed to the tower.

Thus, the gas feed to the tower will be contacted and, therefore, treated with a dilute alkali and with a stronger alkali and finally with water before it leaves tower 6. The gas is then passed by 12 to a dehydrator cooler 30 and thence by 31 to a gas separator 32 for further recovery and treatment as by passing the same by 33 to further dehydration. Any water which condenses in separator 32 is removed to sewer by 34.

Returning now to tower 6, the rates of overflow into the downcomers 15 and 25 are precalculated to maintain desired levels on the trays 11 and 23, the sizes of the downcomers being determined to prevent undue amounts of liquid from passing from an upper section into a lower section.

At the bottom of section C, tray 35 coacts with a plate 36 to provide a gas-receiving section below tray 35. Plate 36 extends almost to but not completely to the bottom of the tower. A baffle element 37 is provided between the tower wall and plate 36. The combination of the plate 36 and baffle 37 permits an operation according to the present invention which, as earlier herein noted involves the use of the caustic wash to clean the gas. Feeding ethylene into section D below tray 35 provides distribution of the ethylene across this portion of the tower and a contact with the solvent therein prior to rising of the gas through plate 35 into dilute caustic wash section C. Polymers are formed in the washes and polymer-forming constituents from the gas are found therein. These polymers can deposit on trays in the column. These are potentially polymerizable hydrocarbons, for example, lower molecular weight compounds. The completely formed polymers which tend to and do accumulate in the caustic wash appear to be a mixture of fine granules with crumbs of various sizes up to about one-fourth-inch size as stated. This appearance of the granules is noted upon removing the same from the caustic wash as by washing with ample water.

According to the invention there is periodically or continuously introduced into the tower by 40 and 5 to treat the caustic, as with the feed gas, a quantity of a solvent (1 to 5 barrels per hour, up to 50 barrels) which will remove in the tower from the wash material polymer and polymer-forming constituents, the solvent, which now is preferred to be an aromatic solvent, which can be other than aromatic, for example, saturated compounds, e.g., a low boiling saturated hydrocarbon, such as isopentane.

The aromatic solvent now preferred is benzene. Related solvents such as toluene, xylene, etc., can also be used.

Still according to the invention the apparatus provides that the selected solvent or solvents used as a single material or as a blend of several materials, after separation of the caustic wash can be passed by 41 from the tower bottom portion to an activated charcoal filter 42 which removes entrained polymers and importantly, the polymer-forming constituents from the solvent thus considerably lengthening the useful life of the solvent and of the caustic wash by avoiding in the first instance the formation of polymers.

As shown in the drawing solvent containing the polymer, either dissolved and/or entrained and the polymer-forming constituents is removed from the tower bottom from below the baffle 37 by valve pipe 43 and/or from just above the very bottom of the tower by pipe 44 which extends up into section D into a solvent phase. If the solvent phase containing the polymer and polymer formers is heavier than the wash liquid, it will be withdrawn from the very bottom of the tower.

The solvent phase ordinarily will collect in the quiescent zone under the baffle 37 and can and will be removed by pipe 43. This is the manner in which actual operation with toluene has been effected in the apparatus here described.

In any event the removed used solvent in passing through the activated charcoal or its functional equivalent is cleaned up, as it were, of the contained polymers and polymer formers and is reusable for additional cycles of use by being passed by 45 to solvent storage 46.

The weak caustic is returned by 47, pump 48, 49 and heater 50 to 27 and thence to the tower for reuse.

A liquid level sensor 52, valves 53 and 54 and control 55, which are conventionally available pieces of apparatus are utilized to maintain the interface between the solvent and the caustic solution in the bottom of the tower below the level of the pipe 43.

Make-up caustic can be added as desired and in the embodiment of the drawing is added to the strong caustic at 51.

About 2–30 per cent solvent by volume of circulating caustic wash are used on an intermittent basis for the operation as herein described.

Again referring to the drawing, a 32 tray column is used to treat about 80,000 pounds per hour of gas entering at about 100° F. and leaving the column at about 101°–105° F. The amount of solvent per injection is about 10–20 standard barrels per injection. The flows of water, strong caustic, NaOH, and weak caustic, NaOH, are as follows: 50, 150 and 75 gallons per minute, respectively.

In a specific operation of the apparatus, as here described, a reformed naphtha (Platformate) consisting essentially of about 40 per cent toluene and about 25 per cent xylenes has been used satisfactorily.

It is an advantage that only small amounts of solvent and of charcoal are needed when operating the invention of Ser. No. 872,309 in the apparatus of the present invention, which keeps at a reduced minimum the formation of polymer, especially when using the charcoal treatment section thereof.

The apparatus as herein described permits cleaning the trays and downcomers in a fractionation type tower while the tower is on-stream. The separation is accomplished in the bottom of the tower.

The following data which have been obtained and have been used as a basis for the invention are of interest to one skilled in the art.

|  | gm Polymer Removed per 100 gm Desiccant | % of Polymer Removed |
|---|---|---|
| Isopentane | 2.4 | 22.5 |
| Benzene | 6.0 | 40.5 |

% polymer removed calculated = $(100 (C_1 - C_2)/C_1)$ $C_1$ = carbon on original desiccant. $C_2$ = % carbon on extracted desiccant.

In a broad concept thereof, the invention is of an apparatus comprising in combination a vessel, means for feeding into an upper portion of said vessel an aqueous treating agent, means for feeding a gas to be treated into a lower portion of said vessel to be therein treated with said agent, means for providing in a lower portion of said vessel, but above the bottom thereof, a quiescent zone comprising a baffle arranged to prevent downflowing liquid from entering directly or passing directly through said zone, means for removing liquid from said vessel from said zone, means for removing treating agent from the bottom of said vessel, and means for introducing a solvent into said vessel above said zone in said vessel for cleaning said treating agent.

Further, the apparatus of the invention comprises means for correlating the rate of removal of liquid by said means for removing liquid from said vessel from said zone and said means for removing treating agent from the bottom of said vessel to provide a liquid level of the treating agent below said means for removing liquid from said vessel from said zone whereby essentially solvent will be removed as the liquid which is removed by said means for removing liquid from said vessel from said zone.

Reasonable variation and modification are possible within the scope of the foregoing disclosure, drawing and the appended claims to the invention the essence of which is that apparatus has been provided for removal of polymers and/or polymer-forming constituents from an alkaline solution such as an alkali-water solution which has been used to treat a cracked hydrocarbon gas containing ethylene, the apparatus comprising in a now preferred embodiment in a bottom portion of a treating vessel a partition extending upwardly from a point near the bottom of said vessel forming at least two subsections, there being provided associated with one of said subsections means to introduce gas to be treated, there being provided means for introducing treating solution to said tower, also means for introducing solvent for removing undesired constituents from said treating solution, and there being provided in another of said subsections but above the bottom of said tower and below the top of said partition a place baffled against down-flow of liquid providing a quiescent zone, and means for removing from said quiescent zone solvent which has been used to remove undesired constituents from said treated solution, in one embodiment the vessel comprising several sections as herein described; in a broad concept, the essence of the invention being in the use of the baffle, pipes, and level control means to provide for the removal of substantially only solvent from said zone.

We claim:

1. An apparatus comprising in combination a vessel first means for feeding into an upper portion of said vessel an aqueous-treating agent, at least one treating section in said vessel in its lower portion, said section containing a partition extending from a point near but not touching the bottom of said vessel upwardly therein to provide at least two subsections, second means for feeding a gas to be treated into said lower portion of said vessel into one of said subsections to be therein treated with said agent, said first means for feeding aqueous-treating solution into said vessel being located above said second means for feeding a gas to said vessel, baffle means in the lower portion of said vessel in another of said subsections but above the bottom of said vessel, providing below said baffle means a quiescent zone in said another of said subsections, said zone comprising said baffle means arranged to prevent downflowing liquid from entering directly or passing directly through said zone thus providing said quiescent zone, third means extending from said vessel directly below said baffle for removing liquid from said vessel from said quiescent zone, fourth means for removing treating agent from the bottom of said vessel, fifth means for introducing an aromatic solvent less dense than said aqueous-treating agent which forms an interface with said aqueous-treating agent into said vessel above said quiescent zone in said vessel for cleaning said treating agent, and sixth means for correlating (1) the removal of liquid by said third means for removing liquid from said vessel from said quiescent zone and (2) for removal of treating agent by said fourth means for removing treating agent from the bottom of said vessel so as to maintain the solvent-treating agent or liquid interface below said quiescent zone in said another subsection whereby essentially only solvent is removed from said quiescent zone by said third means for removing liquid from said vessel from said quiescent zone.

2. An apparatus according to claim 1 having in said vessel, above said second means for feeding a gas to be treated, a section into which said first means for feeding into an upper portion of said vessel an aqueous treating agent feeds said agent, and wherein said fifth means for introducing said solvent into said vessel is in communication with said section and is thus capable to introduce said solvent at least into said section.

3. An apparatus according to claim 1 wherein the vessel is composed of at least four superimposed sections, a top section to remove caustic carryover as by a water wash, a section below said top section wherein gas rising through said sections is treated with a strong caustic wash, a next lower section wherein the gas is treated with a dilute caustic wash to remove polymer and polymer-forming constituents therefrom, and a bottom section forming said lower portion of said vessel in which said quiescent zone is provided and from which said solvent is removed.

4. An apparatus according to claim 3 wherein means are provided in the top section of said vessel to circulate a water wash therein, means are provided to permit gas flowing up the tower to enter into the bottom of said top section and means are associated with said top section to permit a portion of water containing treating solution entrained thereinto by a treated gas and recovered in said top section to pass into the section immediately below said top section.

5. An apparatus according to claim 4 wherein associated with the section below said top section means are provided to circulate a strong treating solution into contact with the gas and wherein means are provided to permit a portion of the thus used treating solution to pass downwardly into said next lower section of the vessel.

6. An apparatus according to claim 5 wherein associated with said vessel and with said third means for removing liquid from said vessel from said quiescent zone there is an apparatus means wherein used solvent containing solid polymer and polymer-forming constituents removed from said gas into said aqueous-treating agent and from said treating agent into said solvent is contacted with a further treating agent to remove said solid polymer and polymer-forming constituents from said solvent and, further, means for returning thus treated solvent to said vessel for reuse.

* * * * *